(12) United States Patent
Ferris et al.

(10) Patent No.: US 11,112,878 B2
(45) Date of Patent: Sep. 7, 2021

(54) KEYBOARDS WITH CONFIGURABLE DISPLAYS

(71) Applicant: Hewlett-Packard Development Company, L.P., Spring, TX (US)

(72) Inventors: Sara Ferris, Houston, TX (US); Dimitre D. Mehandjiysky, Houston, TX (US); Kevin L. Massaro, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,687

(22) PCT Filed: Oct. 10, 2017

(86) PCT No.: PCT/US2017/055854
§ 371 (c)(1),
(2) Date: Mar. 19, 2020

(87) PCT Pub. No.: WO2019/074485
PCT Pub. Date: Apr. 18, 2019

(65) Prior Publication Data
US 2020/0285323 A1    Sep. 10, 2020

(51) Int. Cl.
*G06F 3/02* (2006.01)
*G06F 3/046* (2006.01)
(Continued)

(52) U.S. Cl.
CPC ............ *G06F 3/021* (2013.01); *G06F 1/1624* (2013.01); *G06F 1/1649* (2013.01); *G06F 1/266* (2013.01);
(Continued)

(58) Field of Classification Search
CPC ......... G06F 1/1601–1698; G06F 1/266; G06F 3/021; G06F 3/0219; G06F 3/041–047;
(Continued)

(56) References Cited

U.S. PATENT DOCUMENTS

| | | | |
|---|---|---|---|
| 5,644,338 A | 7/1997 | Bowen | |
| 7,283,847 B2 * | 10/2007 | Kim | H04M 1/0247 455/550.1 |

(Continued)

FOREIGN PATENT DOCUMENTS

| | | |
|---|---|---|
| CN | 104090666 A | 10/2013 |
| CN | 204009783 U | 7/2014 |
| KR | 20160068099 A | 6/2016 |

OTHER PUBLICATIONS

Seth, R., In 2020 We Can Wear Sony Computers on Our Wrist, May 25, 2010 <http://www.yankodesign.com/2010/05/25/in-2020-we-can-wear-sony-computers-on-our-wrist/ >.

*Primary Examiner* — Gene W Lee
(74) *Attorney, Agent, or Firm* — HP Inc. Patent Department

(57) ABSTRACT

In example implementations, an all-in-one (AIO) keyboard is provided. The AIO keyboard may include a plurality of keys, a configurable touch screen display and a movable display. The configurable touch screen display is located adjacent to the plurality of keys on a top side of a housing. The movable display is movably coupled to a bottom side of the housing below the plurality of keys.

17 Claims, 4 Drawing Sheets

(51) Int. Cl.
*G06F 1/26* (2006.01)
*G09G 5/12* (2006.01)
*G06F 1/16* (2006.01)
*G06F 3/14* (2006.01)
*G06F 3/0488* (2013.01)

(52) U.S. Cl.
CPC ............ *G06F 3/0219* (2013.01); *G06F 3/046* (2013.01); *G06F 3/04883* (2013.01); *G06F 3/1423* (2013.01); *G09G 5/12* (2013.01)

(58) Field of Classification Search
CPC ... G06F 3/04883; G06F 3/1423; G06F 3/1454
See application file for complete search history.

(56) References Cited

U.S. PATENT DOCUMENTS

| | | | |
|---|---|---|---|
| 7,397,658 B2 * | 7/2008 | Finke-Anlauff | G06F 1/1624 345/168 |
| 8,723,814 B2 * | 5/2014 | Griffin | G06F 1/1626 345/173 |
| 9,094,730 B1 * | 7/2015 | Kirmse | H04N 21/25825 |
| 2005/0025550 A1 | 2/2005 | McLoone | |
| 2007/0211036 A1 | 9/2007 | Perkins | |
| 2010/0207888 A1 | 8/2010 | Camiel | |
| 2010/0302141 A1 * | 12/2010 | Shankar | H04M 1/7253 345/156 |
| 2011/0009169 A1 * | 1/2011 | Kim | G06F 1/1692 455/566 |
| 2012/0001852 A1 | 1/2012 | Ho et al. | |
| 2012/0243042 A1 * | 9/2012 | Uchida | H04N 1/00408 358/1.15 |
| 2013/0203469 A1 | 8/2013 | Cho et al. | |
| 2016/0154433 A1 | 6/2016 | Su et al. | |
| 2016/0334881 A1 | 11/2016 | Kong | |
| 2017/0248999 A1 * | 8/2017 | Ng | G06F 1/3287 |
| 2018/0095502 A1 * | 4/2018 | Yamazaki | G06F 1/1643 |

* cited by examiner

KEYBOARDS WITH CONFIGURABLE DISPLAYS

BACKGROUND

Computers have evolved over the years. Computers started with a desktop portion that included the processor and hardware, an external display connected to the desktop portion and external input devices (e.g., a keyboard and mouse). Over the years the form factor of computers has slowly shrunk to all-in-one computers and tablet computers.

The all-in-one computers are designed around the display. The display includes the hardware components and is connected to external input devices such as a keyboard and a mouse. The tablet computers are focused around an all touch screen interface. The user may interact with the tablet computer using the touchscreen or removably connected input interfaces (e.g., a keyboard that can be connected).

DETAILED DESCRIPTION

Examples described herein provide a keyboard that includes configurable displays. As discussed above, the form factor of computers has shrunk to all-in-one (AIO) computers or tablet computers. However, the current AIO computers are designed around a relatively large display. The tablet computers are designed around an all touch screen interface.

Examples described herein provide a keyboard that can perform as an AIO computer. The AIO is designed around the form factor of a keyboard and may include configurable displays or the ability to connect to an external display. A first display may be a touch screen display that can serve as a touch pad input and provide customized displays depending on a desired functionality or particular application that is being executed.

A second display may be movably coupled to the keyboard. The second display may provide a stand-alone display or a richer interaction with what is being displayed on an externally connected display. The second display may be moved towards a user or away from a user to provide different configurations for use.

Figure 1:
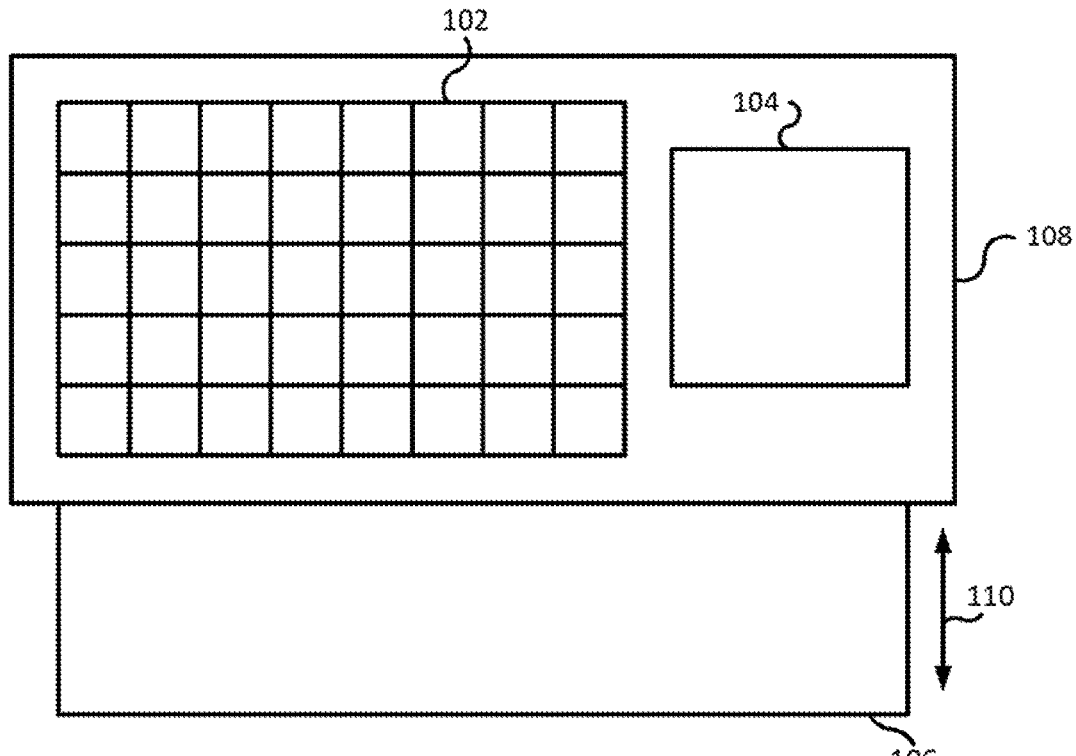
FIG. 1 is a block diagram of an example all-in-one (AIO) keyboard apparatus of the present disclosure with a movable display positioned towards a user.

FIG. 1 illustrates a block diagram of an all-in-one (AIO) keyboard apparatus 100 (also referred to herein as the AIO keyboard 100 or the apparatus 100). In one example, "all-in-one" may be defined to mean that the AIO keyboard 100 may provide computing capabilities with a processor and display capabilities. However, the AIO keyboard 100 may have a form factor of a keyboard rather than a large display.

In one example, the AIO keyboard 100 may include a plurality of keys 102 (e.g., a keyboard), a first display or a configurable touch screen display 104 and a second display or a movable display 106. The configurable touch screen display 104 may be located adjacent to the plurality of keys 102 on a topside of the housing 108. The movable display 106 may be coupled to a bottom side of the housing 108 below the plurality of keys 102. The hardware components of the AIO keyboard 100 may be enclosed within a housing 108 of the AIO keyboard 100.

The AIO keyboard 100 may function as a stand-alone AIO computing device that has the form factor of a keyboard rather than a large monitor similar to AIO computers available today. The AIO keyboard 100 may also function as a portable input/output device to larger desktop computing systems.

In one example, the configurable touch screen display 104 may be a touch pad that detects touch inputs. For example, a user may move his or her hand on the configurable touch screen display 104 to control a pointer or a mouse on an external monitor.

The configurable touch screen display 104 may also be configured to display different images or touch interfaces. In one example, the images may be user selected images (e.g., a wallpaper). In another example, the configurable touch screen display 104 may display a touch interface that is selected by a user. For example, the user may want a remote touch interface displayed on the configurable touch screen display 104 while watching a movie.

In another example, the images or the touch interfaces that are displayed may be dynamically changed based on an application that is being executed by the AIO keyboard 100. For example, if the user is listening to music, the configurable touch screen display 104 may display a music playlist, if the user is playing a video game, the configurable touch screen display 104 may display custom controls for the video game, if the user is running a photo editor application, the configurable touch screen display 104 may display a color palette, and the like.

In one example, the user may change the image that is being displayed by swiping left or right (e.g., using two fingers) on the configurable touch screen display 104. In another example, physical buttons may be deployed on the housing 108 of the AIO keyboard 100 that can be programmed to cause the configurable touch screen display 104 display a specific image. For example, one physical button can be programmed to have a music play list displayed in the configurable touch screen display 104, a second physical button can be programmed to have custom controls for a video game displayed on the configurable touch screen display 104, and the like.

The movable display 106 may be a monitor that is movably connected to the plurality of keys 102. The movable display 106 may be a touch screen that can detect and process touch inputs on the physical screen of the movable display 106. In one example, the movable display 106 may be connected to a bottom side of the housing 108 that is opposite a top side of the housing 108 where the plurality of keys 102 is located. The movable display 106 may slide in and out from beneath the plurality of keys 102 as illustrated by an arrow 110.

FIG. 1 illustrates an example where the movable display 106 is positioned towards a user. For example, in certain applications the user may have the movable display 106 positioned flat towards the user. An example application may include when a user wants to take hand written notes on the movable display 106.

Figure 2:
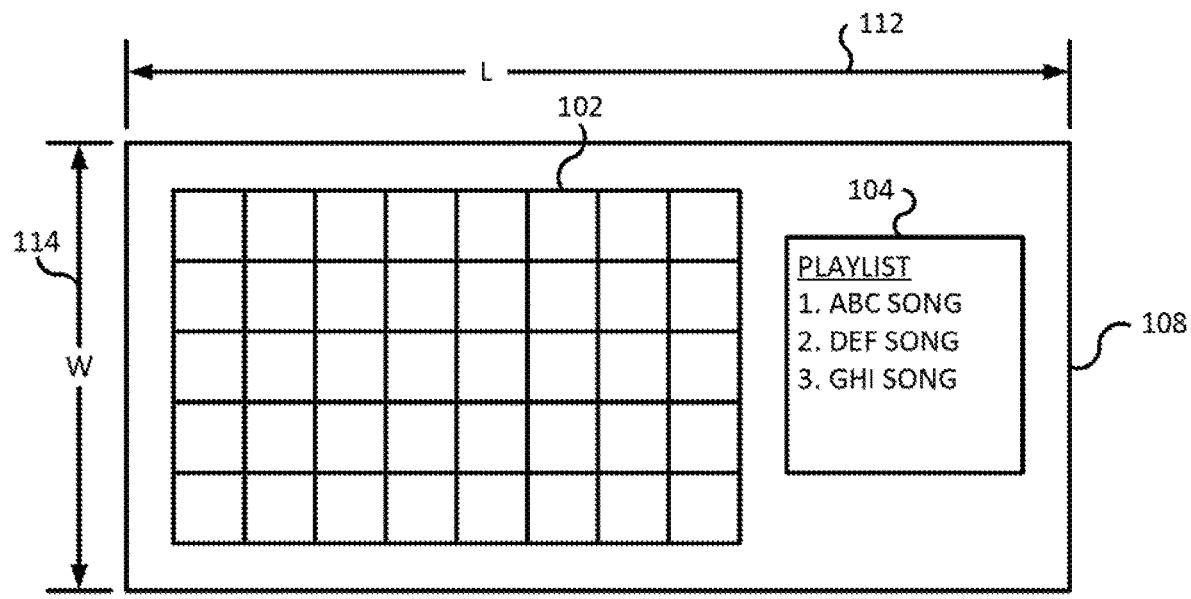
FIG. 2 is a block diagram of the example AIO keyboard apparatus with the movable display slid behind a keyboard.

FIG. 2 illustrates an example of the AIO keyboard 100 where the movable display 106 is positioned in a hidden position when not in use. In one example, the movable display 106 may have approximately the same dimensions as the housing 108. In one example, the movable display 106 may have dimensions that are slightly smaller than the dimensions of the housing 108. Dimensions may be defined as a length 112 and a width 114 as shown in FIG. 2.

FIG. 2 illustrates an example where the configurable touch screen display 104 is configured to display a playlist. For example, the AIO keyboard 100 may be used to listen to music and the movable display 106 is hidden. The user may select different songs by touching the desired song title on the configurable touch screen display 104.

Figure 3:
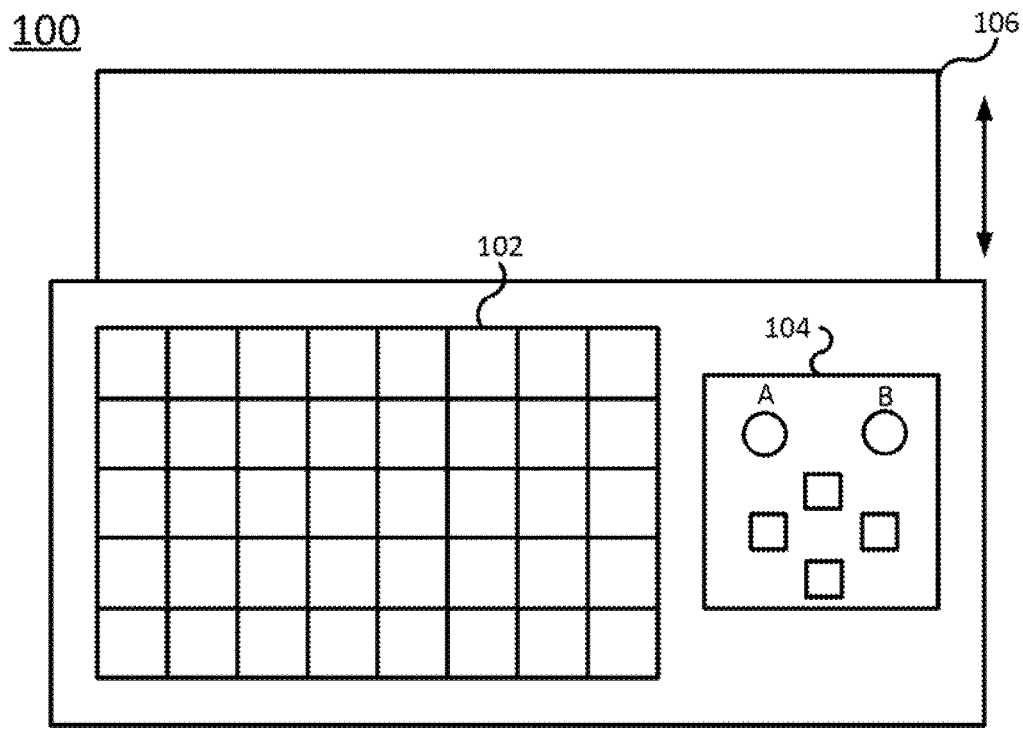
FIG. 3 is a block diagram of the example AIO keyboard apparatus with the movable display positioned away from the user.
Figure 4:
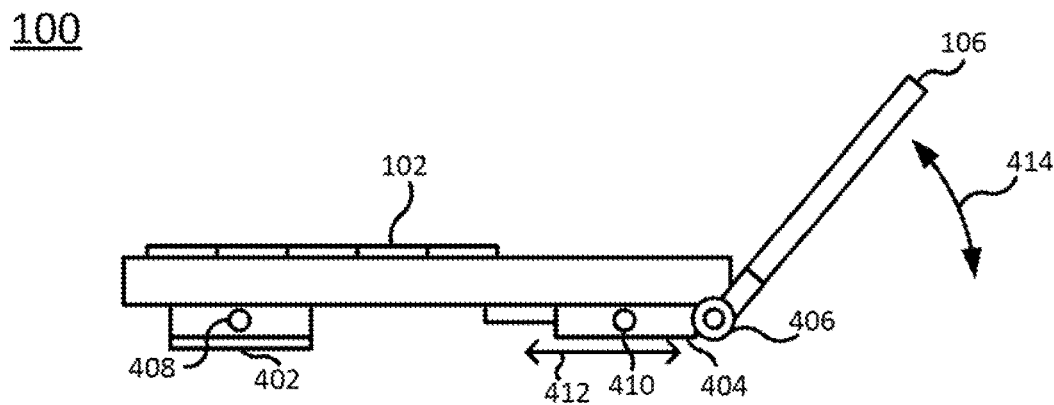
FIG. 4 is a block diagram of a side view of the example AIO keyboard apparatus positioned away from the user.

FIG. 3 illustrates an example of the AIO keyboard 100 where the movable display 106 is positioned away from a user. FIG. 4 illustrates a side view of the AIO keyboard 100 when the movable display 106 is positioned away from the user. As shown by FIGS. 1-4, the movable display 106 may move or slide into three different positions (e.g., towards the user, hidden, or away from the user).

For example, the movable display 106 may slide along a direction shown by an arrow 412 in FIG. 4. A guide portion 402 and 404 may provide a track, or a sliding mechanism, for the movable display 106 to move. The guide portion 402 and 404 may be any type of mechanical connection that allows the movable display 106 to move along the directions shown by the arrow 412.

In one example, the movable display 106 may be positioned away from the user when being used as a stand-alone computing device. In other words, when the movable display 106 is positioned away from the user the AIO keyboard 100 may be a lap top computer. As shown, in FIG. 4, the movable display 106 may be tilted to a desired viewing angle and may be tilted as shown by an arrow 414 in FIG. 4.

In one example, the movable display 106 may include a torque hinge 406. For example, the movable display 106 may include an extended bezel that may have a hinge with the torque hinge 406. The torque hinge 406 may rotate with force, but hold the movable display 106 in a desired position or viewing angle. In one example, the guide 404 may lock a portion of the movable display 106 when positioned away from the user. The guide 404 may include the torque hinge 406, which may then move the movable display 106.

In one example, the guide 402 may include an electronic sensor 408 and the guide 404 may include an electronic sensor 410. The electronic sensors 408 and 410 may detect the position of the movable display 106. For example, when the electronic sensor 408 is triggered, the AIO keyboard 100 may know that the movable display 106 is positioned towards the user. When the electronic sensor 408 and the electronic sensor 410 are triggered, the AIO keyboard 100 may know that the movable display 106 is hidden. When the electronic sensor 410 is triggered, the AIO keyboard 100 may know that the movable display 106 is positioned away from the user. The AIO keyboard 100 may operate differently based on where the movable display 106 is positioned, as discussed in further detail below.

In one example, the movable display 106 may be positioned away from the user and the user may run a video game application. The movable display 106 may display a main portion of the video game. However, as shown in FIG. 3, the configurable touch screen display 104 may display a custom control pad that works with the video game. For example, the custom control pad may include directional buttons, action buttons, and the like.

Figure 5:
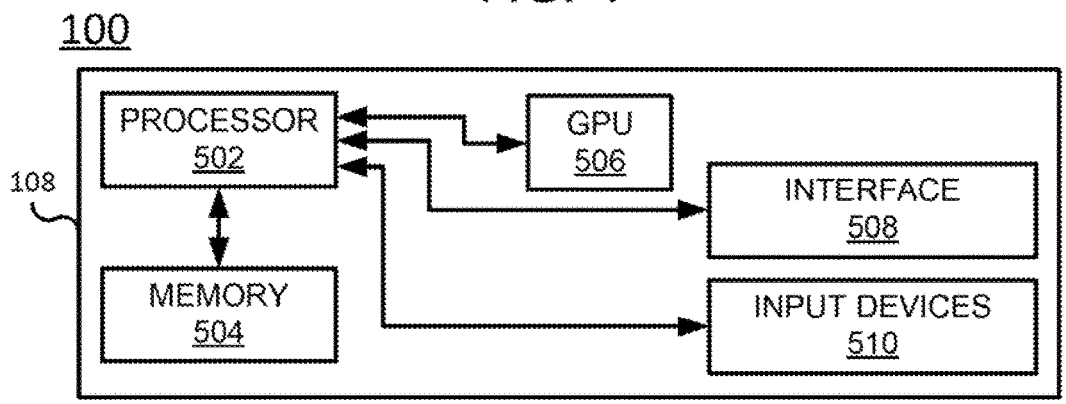
FIG. 5 illustrates a functional block diagram of the example AIO keyboard apparatus.

FIG. 5 illustrates a functional block diagram of the AIO keyboard 100. As noted above, hardware components of the AIO keyboard 100 may be enclosed by the housing 108. In one example, the AIO keyboard 100 may include a processor 502, a memory 504, a graphical processing unit (GPU) 506, interfaces 508, and input devices 510. The processor 502 may be electronically and communicatively coupled to the memory 504, the GPU 506, the interfaces 508, and the input device 510.

In one example, the memory 504 may be a non-transitory computer readable medium (e.g., random access memory (RAM), read only memory (ROM), hard disk drive, and the like). The memory 504 may store instructions, applications, programs, and the like that are executed by the processor 502. The GPU 506 may generate and process graphical information that is displayed on the configurable touch screen display 104, the movable display 106, and an external display (if connected). The interfaces 508 may be interfaces, such as a universal serial bus (USB) interface, a display connector interface, external power cord interface, and the like, that allows external devices to be connected to the AIO keyboard 100. The input devices 510 may be hardware (e.g., resistive glass that detects touch inputs on the configurable touch screen display 104 and the movable display 106) or sensors (e.g., the electronic sensors 408 and 410) that allow inputs received from the configurable touch screen interface 104 and the movable display 106 to be received by the processor 502.

In one example, the processor 502 may process inputs received from the input devices 510. For example, the electronic sensors 408 and 410 may be example input devices 510. As noted above, when the electronic sensor 408 is triggered or the electronic sensor 410 is triggered, the processor 502 may receive an electronic signal. The processor 502 may determine that the movable display 106 is positioned towards the user or away from the user, respectively, and activate the movable display 106. The processor 502 may determine what images are to be displayed on the movable display 106 and communicate with the GPU 506 to format the images for display on the movable display 106.

In another example, when the electronic sensors 408 and 410 are both triggered, the processor 502 may determine that the movable display 106 is in a hidden position and not in use. As a result, the processor 502 may power down the movable display 106 and conserve battery life or reduce power consumption.

In another example, the processor 502 may receive a signal that an external monitor is connected to the interfaces 508. The processor 502 may then transmit image data to the GPU 506 for formatting the image data for display on the external monitor. When the electronic sensor 408 is triggered, the processor 502 may determine that the movable display 106 is positioned towards the user and power on the movable display 106. The processor 502 may receive inputs via the input devices 510 (e.g., a touch input on the configurable touch screen display 104) that selects a portion of the image on the external display. The processor 502 may provide the portion of the image to the GPU 506 for formatting to display on the movable display 106. The portion of the image may then be displayed on the movable display 106.

The user may then write or take notes on that portion of the image on the movable display 106. The processor 502 may process the inputs and provide the image data to the GPU 506. The GPU 506 may then format the image data to display the user written notes received on the movable display 106 onto the external display.

The above examples provide a few illustrations of how the hardware devices may interact or operate in the AIO keyboard 100. It should be noted that other examples may also be apparent. It should be noted that FIG. 5 has been simplified for ease of explanation. The AIO keyboard 100 may include other hardware devices that are not shown, e.g., a battery, additional circuitry, circuit boards, and the like.

Figure 6:
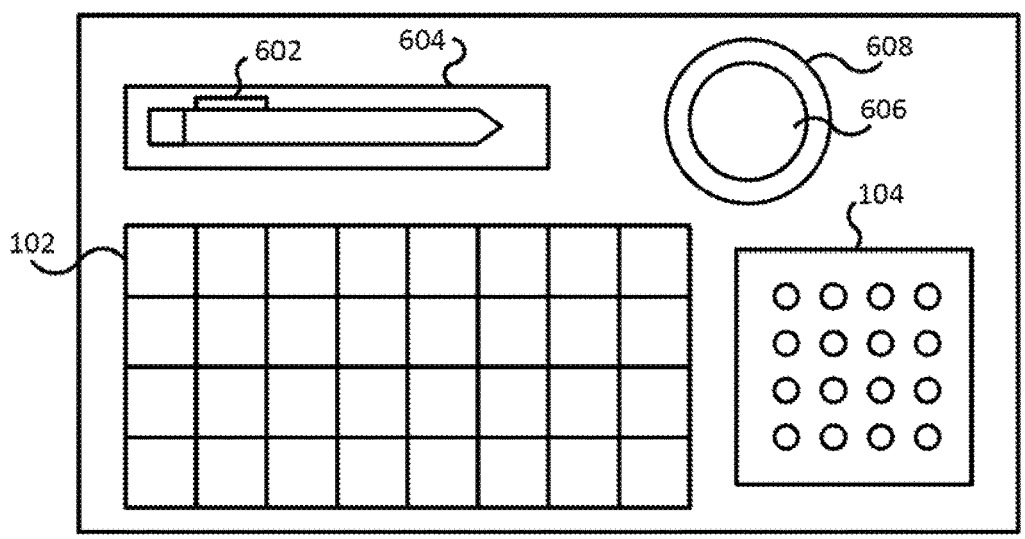
FIG. 6 illustrates a block diagram of another example of the AIO keyboard apparatus.

FIG. 6 illustrates a block diagram of another example of the AIO keyboard 100. In one example, the AIO keyboard 100 may include first magnetic charging cradle 604 and a second magnetic charging cradle 608. The first magnetic charging cradle 604 may be a cradle to hold and re-charge an input pen 602. The input pen 602 may be used as a stylus to interact with the configurable touch screen display 104 and the movable display 106. For example, the input pen 602 may be used to select options or to write on the movable display 106.

The second magnetic charging cradle 608 may be used to hold and re-charge a jogger device 606. For example, the jogger device 606 may be a wireless control that can be used with a variety of different applications (e.g., a music application for a DJ, scrolling through menus, and the like).

As shown, in FIG. 6, the configurable touch screen display 104 may be changed again to show a palette of different colors when a photo editing software is executed by the AIO keyboard 100. As noted above, the configurable touch screen display may be dynamically changed based on what applications are being executed, what displays are active, and the like.

Figure 7:
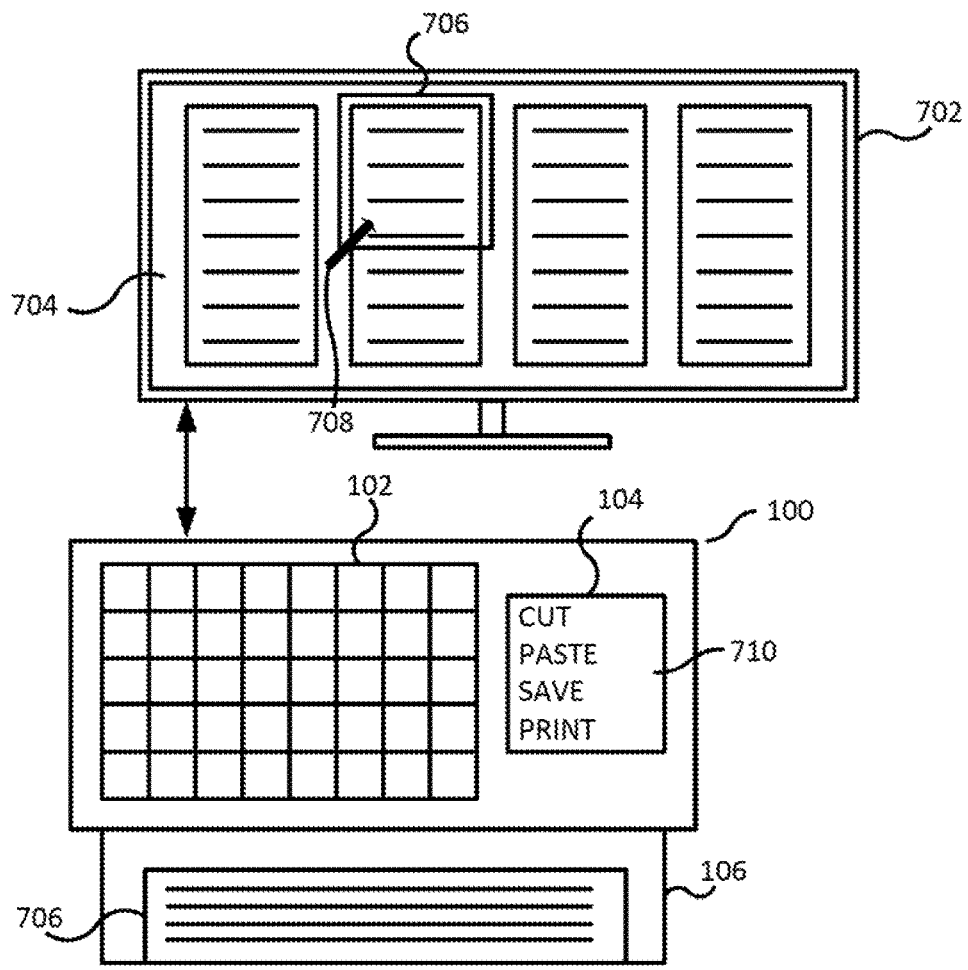
FIG. 7 illustrates a block diagram of the another example AIO keyboard apparatus operating with an external monitor.

FIG. 7 illustrates a block diagram of one example of the AIO keyboard 100 operating with an external monitor 702. In one example, the AIO keyboard 100 may be connected to the external monitor 702 and images generated by the AIO keyboard 100 may be displayed on the external monitor 702. For example, the external monitor 702 may be a primary monitor and the configurable touch screen display 104 and the movable display 106 may be secondary monitors.

FIG. 7 illustrates one example where the AIO keyboard 100 may be executing a word processing application, or multiple different applications, that display images 704. The user may move a pointer 708 via the configurable touch screen interface 104 to select a portion 706 of the image 704. The portion 706 of the image 704 may be a subset of the entire image 704.

In one example, the user changes the configurable touch screen interface 104 between operating as a touch pad to control the pointer 708 and operating as a touch screen that displays images based on the application that is running. For example, the user may double tap, press a physical button, swipe with two fingers, etc., on the configurable touch screen interface 104 to change between touch pad control and displaying images.

The AIO keyboard 100 may detect that the movable display 106 is positioned towards the user, as described above. Based on the application that is being executed and the position of the movable display 106, the AIO keyboard 100 may configure the movable display 106. For example, if a word processing application is being executed and the movable display 106 is positioned towards the user, the AIO keyboard 100 may configure the movable display 106 to receive writing input, display a notepad for handwritten or typed notes, adding comments to the selected portion 706, and the like.

In the example illustrated in FIG. 7, the portion 706 of the image 704 may be displayed on the movable display 106. Notably, the entire image 704 is not mirrored on the movable display 106. Although the entire image 704 could be reduced to be displayed on the movable display 106, it may not be practical as the size of the movable display 106 may be much smaller than the size of the external monitor 702. The user may write notes on the movable display 106 (e.g., using the input pen 602) and the written notes may be transmitted and displayed on the external monitor 702. Notably, the movable display 106 may provide a more natural and comfortable writing surface than attempting to write on the external monitor 702 that is positioned vertically.

In another example, the movable display 106 may display an interface (e.g., a menu) associated with the portion 706 of the image 704 that is selected on the external monitor 702. For example, if the portion 706 includes text, the movable display 106 may provide an interface for spelling corrections, a thesaurus, alternative word choices, a font editor, and the like. In another example, if the portion 706 includes an image, the movable display 106 may provide an interface for image editing, a paintbrush tool, alternative images that are similar to the image in the portion 706, and the like.

In addition, FIG. 7 illustrates another example image that can be displayed in the configurable touch screen display 104. For example, the configurable touch screen display 104 may be configured to display menu selections that are most often used. Thus, the user may touch "save" in the configurable touch screen display 104 rather than moving the pointer 708 to a menu selection or drop down menu and then moving to "save".

In one example, selecting an option in the configurable touch screen display 104 may change the configurable touch screen display 104 into another menu. For example, the user may touch "print" and then the configurable touch screen display 104 may display available printers. Although various example images for the configurable touch screen display 104 are illustrated in the present disclosure, it should be noted that other examples may also be deployed.

Thus, the AIO keyboard 100 provides a portable all-in-one computer that has a smaller form factor than an all-in-one computer based on the form factor of a monitor. The AIO keyboard 100 may be used as a stand-alone computing device or an external device connected to a monitor that provides a plurality of options for richer interaction with applications and programs.

Figure 8:
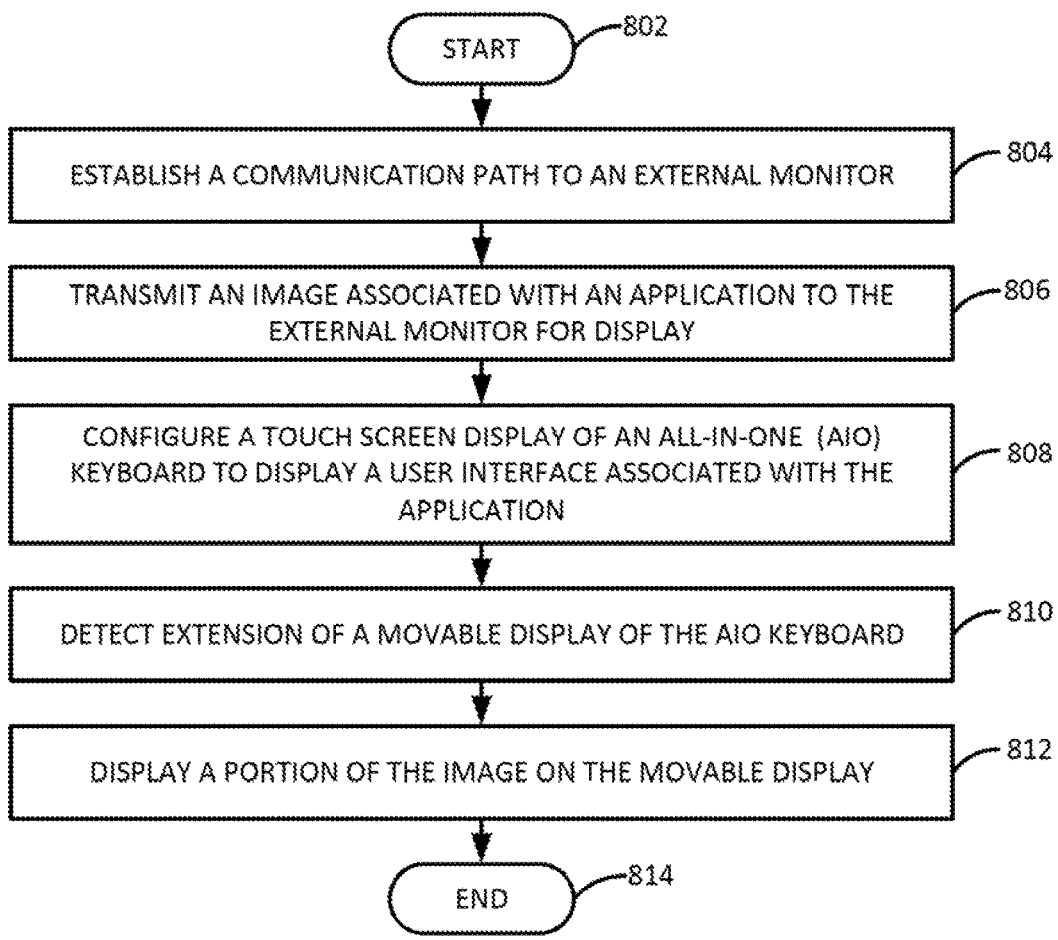
FIG. 8 is a flow chart of an example method for configuring displays of an AIO keyboard.

FIG. 8 illustrates a flow diagram of an example method 800 for configuring displays of an AIO keyboard. In one example, the method 800 may be performed by the processor 502 of the AIO keyboard 100.

At block 802, the method 800 begins. At block 804, the method 800 establishes a communication path to an external monitor. For example, a video connection cable may be used to electrically connect the external monitor to the AIO keyboard via an interface on the AIO keyboard.

At block 806, the method 800 transmits an image associated with an application to the external monitor for display. The AIO keyboard may execute a program or application that is transmitted to the external monitor for display. For example, the AIO keyboard may execute a video game application or a word processing application. The images or graphics associated with the video game application or the word processing application may be displayed on the external monitor.

At block 808, the method 800 configures a touch screen display of the AIO keyboard to display a user interface associated with the application. In one example, based on the application that is being executed, a configurable touch screen display may be configured to display a different image. For example, if a video game application is being executed, the configurable touch screen display may display custom controls for the video game. In another example, if a word processing application is being executed, the configurable touch screen display may display menu options that are most often used. In another example, if a photo editing software is being executed the configurable touch screen display may display a color palette when an image is being edited. In another example, if a music application is being executed, the configurable touch screen display may display a play list of songs.

At block 810, the method 800 detects extension of a movable display of the AIO keyboard. In one example, the AIO keyboard may include electronic sensors on a sliding mechanism that is coupled to the movable display. As the movable display triggers the electronic sensors, the AIO keyboard may detect a position of the AIO keyboard. When the movable display of the AIO keyboard is positioned away from the user or towards the user, the AIO keyboard may detect the extension of the movable display, power on the movable display and configure the movable display based on the position and the application that is being executed.

At block 812, the method 800 displays a portion of the image on the movable display. In one example, the user may select a portion of the image that is being displayed on the external monitor. The portion that is selected may then be displayed on the movable display. The user may interact with the portion that is selected on the movable display and the interactions may be displayed on the external monitor. For example, interactions may include taking notes, making comments on the portion that is displayed on the movable display, editing the portion that is displayed on the movable display, and so forth.

Thus, the AIO keyboard may configure both the movable display and the configurable touch screen display based on the application that is being executed, a position of the movable display, and a portion of the image on an external monitor that is selected. At block 814, the method 800 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An all-in-one keyboard, comprising:
a plurality of keys;
a configurable touch screen display adjacent to the plurality of keys on a top side of a housing;
a movable display that is movably coupled to a bottom side of the housing below the plurality of keys; and
a torque hinge coupleable to the movable display, the torque hinge to maintain the moveable display at a viewing angle when the moveable display is exposed, wherein the movable display is slidable among:
a first position corresponding to a first side of the plurality of keys,
a second position corresponding to being hidden under the plurality of keys, and
a third position correspond to a second side of the plurality of keys.

2. The all-in-one keyboard of claim 1, wherein hardware components of the all-in-one keyboard are enclosed within the housing of the plurality of keys.

3. The all-in-one keyboard of claim 1, wherein an interface of the configurable touch screen display changes based on an application being executed by the all-in-one keyboard.

4. The all-in-one keyboard of claim 1, wherein dimensions of the movable display are approximately equal to dimensions of a housing of the plurality of keys.

5. The all-in-one keyboard of claim 1, wherein the movable display is coupled to the plurality of keys via a sliding mechanism that allows the movable display to extend towards a user and away from a user.

6. The all-in-one keyboard of claim 5, wherein the viewing angle of the movable display is adjustable via the torque hinge when the movable display is extended away from the user.

7. The all-in-one keyboard of claim 1, further comprising;
a first magnetic charging cradle to charge an interactive pen; and
a second magnetic charging cradle to charge a jogger device.

8. The all-in-one keyboard of claim 1, wherein:
the configurable touch screen display is to receive touch screen input; and the movable display is to receive writing input from an input pen when the moveable display is extended.

9. An apparatus, comprising:
a plurality of keys comprising a housing;
a magnetic charging cradle on the housing to charge an input device;
a first display located adjacent to the plurality of keys on the housing; and a second display movably coupled to a bottom side of the housing that is opposite a top side of the housing that includes the plurality of keys,
wherein:
the second display is movable among:
a first position corresponding to a first side of the plurality of keys,
a second position corresponding to being hidden by the housing of the plurality of keys, and
a third position corresponding to a second side of the plurality of keys; and
the second display is to:
display a first image when extended on the first side of the plurality of keys, and
display a second image different from the first image when extended on the second side of the plurality of keys.

10. The apparatus of claim 9, further comprising:
a first magnetic charging cradle on the top side of the housing to charge an interactive pen; and
a second magnetic charging cradle on the top side and adjacent to the first magnetic charging cradle to charge a jogger device.

11. The apparatus of claim 9, wherein a touch interface displayed by the first display is selected by a user.

12. The apparatus of claim 9, comprising:
a processor enclosed in the housing, wherein the processor is communicatively coupled to the first display and the second display to control operation of the first display and the second display.

13. The apparatus of claim 9, wherein the second display is coupled via a sliding track on the bottom side of the housing that allows the second display to extend towards a user and allows the second display to extend away from a user.

14. The apparatus of claim 13, wherein a viewing angle of the second display is adjusted via a torqued hinge when the second display is extended away from the user.

15. A method, comprising:
- establishing, by a processor of an all-in-one (AIO) keyboard, a communication path to an external monitor;
- transmitting, by the processor, an image associated with an application to the external monitor for display;
- configuring, by the processor, a touch screen display of the AIO keyboard to display a user interface associated with the application;
- detecting, by the processor, extension of a movable display of the AIO keyboard;
- configuring, by the processor, the movable display to receive writing input from an input pen based on a position of the moveable display and the application;
- displaying, by the processor, a portion of the image on the movable display; and
- configuring, by the processor, both the movable display and the touch screen display based on the application that is being executed, a position of the movable display, and a portion of the image on an external monitor that is selected.

16. The method of claim 15, further comprising:
- detecting, by the processor, writing on the movable display;
- transmitting, by the processor, video data to the external monitor, the video data corresponding to the writing that is detected; and
- causing, by the processor, the external monitor to display the writing on the portion of the image displayed by the external monitor.

17. The method of claim 16, further comprising;
- charging an interactive pen with a magnetic charging cradle of the AIO;
- wherein the writing is detected by the processor based on a location of the interactive pen with respect to the movable display.

\* \* \* \* \*